E. R. ROSEN-BAUM.
APPARATUS FOR WELDING METALS.
APPLICATION FILED AUG. 14, 1911.
1,032,431.
Patented July 16, 1912.
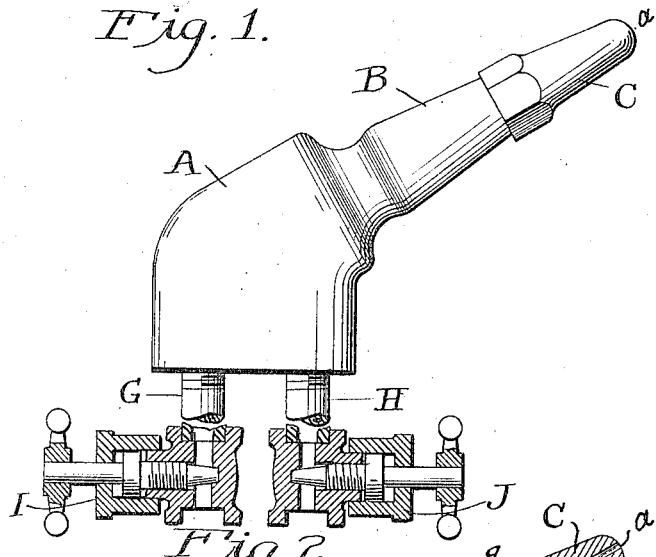
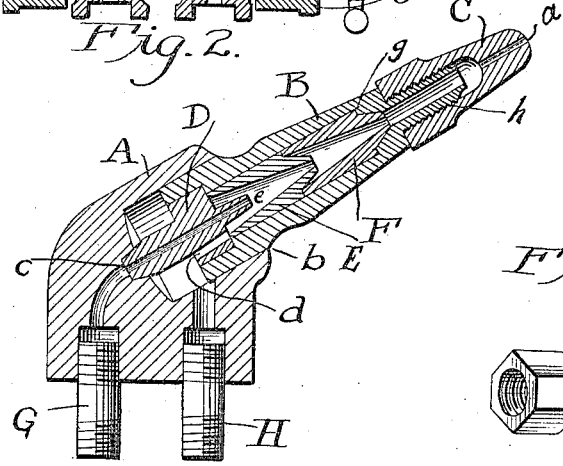
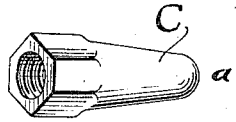
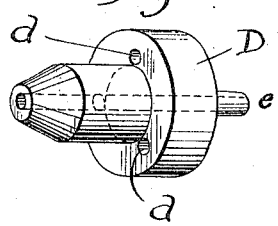
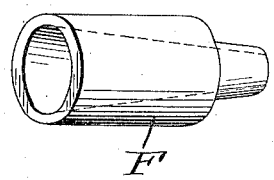

UNITED STATES PATENT OFFICE.

EUGENE RAVEN ROSEN-BAUM, OF NEW YORK, N. Y.

APPARATUS FOR WELDING METALS.

1,032,431.  Specification of Letters Patent.  Patented July 16, 1912.

Application filed August 14, 1911. Serial No. 644,067.

*To all whom it may concern:*

Be it known that I, EUGENE RAVEN ROSEN-BAUM, a citizen of the Empire of Germany, residing in the borough of Manhattan, in the city, county, and State of New York, (post-office address, 603 West Forty-third street,) have invented certain new and useful Improvements in Apparatus for Welding Metals, of which the following is a description.

This invention relates to apparatus for welding metals by means of a flame produced by the ignition of two gases mixed under pressure near the point of combustion.

The improvements also comprise means for regulating the supply of gases under different pressures and combined with convenient means for changing the size of the outlet of the tip through which the gases pass, after mixture, at the point of combustion.

One of the objects of my invention is to provide an oxy-hydrogen torch or welding tool, in which the entire mechanism, including the mixing chambers where the gases are mixed after being brought together, will be a part of, and integral with the head of the device. So that the head and mixing chambers will be distinct and separate from the tip, which controls the size of the flame, for different kinds of work. This is distinguished from those torches in which the chamber for mixing the gases and means for controlling the relative supply of each to the mixing chamber, is contained within the tip and removable therewith, so that the mixing chamber for various classes of work, is changed with the tip and adjusted to the size of the outlet of the tip.

In the accompanying drawings: Figure 1 represents a side elevation of the head of the welding tool and the controlling valves, which are shown in section. Fig. 2 is a longitudinal, vertical, mid-section through the main portion of Fig. 1, except the valves. Fig. 3 is a detached view of the burner tip Fig. 4 is a detached view of the combiner and Fig. 5 is a view of one of the mixers.

The head is composed of the body A to which is welded or brazed the mixing chamber holder B so it is integral therewith. At the extremity of the head is the tip or nozzle C which is attached by a screw thread and intended to be readily removed. The diameter of the outlet $a$ of the nozzle or tip C is intended to be changed by the use of a series of tips having different sized outlets.

Contained within the head and permanently secured therein are the combining device D and the mixers E, F.

The holder B should be nicely fitted into the body A and welded or otherwise permanently secured at $b$ so as to be gas tight and hold the combiner D in position against the inlet of the gas pipe G which connects with the oxygen gas supply. The acetylene gas is supplied through the pipe H. The relative pressure of the gases is regulated by any convenient means at some point between the source of supply and the holder. In the drawings I have shown for this purpose needle valves I and J in the pipes G and H but the governing apparatus may be located at some other point.

The interior end of the device D, which I term a combiner, fits against the back of the head so as to provide a passage for the oxygen from the pipe G through its central openings $c$. The acetylene gas passing into the head through the pipe H is conducted by the openings $d$, $d$, in the combiner D to the chamber in the mixer E, where it is mixed with the oxygen. The oxygen may be less in volume than the acetylene gas, but under greater pressure, so that it tends to draw the acetylene along. The chamber of the mixer E is made circular and conical in form, being narrowest at its outlet, while it is sufficiently broad at its base to include the inlet passages $d$, $d$, of the part D. The outlet $e$ for the oxygen is extended into the chamber of the mixer E and vents directly in a line with the narrowed outlet thereof. After the two gases are combined in the chamber of the mixer E, they are forced into the chamber of the mixer F, where they are again more intimately mingled. The difference in pressure of the two gases, combined with the construction of the parts, causes a complete mixture of the gases to take place, so combustion may be safely obtained through any size of vent or tip. The end of the head may be threaded at $h$ to receive the tip C, having a bore of any desired diameter.

I preferably make the parts of the head, the mixers and tip of brass, but other material may be used.

I have shown two mixers, E and F, which are exact counterparts of each other and adapted to fit snugly one over the other and make a tight joint. In the use of acetylene and oxygen, I have found a good mixture may be obtained with them, but my invention is not limited to the use of any particular number of such mixers. Cases may arise where better results will be obtained by a more intimate mixture of the gases, which may be obtained by using a greater number of the mixers. In order to provide for an increase in the number of mixers in series, it is only necessary to lengthen the outer portion B of the head, so it will accommodate the additional number.

Care must be taken to have all the parts where they rest on each other make gas proof joints, when the parts A and B are hermetically joined together by brazing. It will be apparent that by first making the head in two parts, A and B, and thereafter brazing them together, I am enabled to properly insert therein, the combiner D, and a series of mixers E and F, in their proper places.

Having described my device and what I claim as my invention and desire to secure by Letters Patent is:

A gas torch for welding metals comprising a head with inlets for two kinds of gas, a combiner located in the head, interchangeable conical mixing chambers E, F, confined within said head and arranged one in rear of the other and communicating to form a passage, and an outer vent for the mixed gases forming a continuation of the passage E, F, substantially as described.

E. RAVEN ROSEN-BAUM.

Witnesses:
   MICHAEL J. MCDONNELL,
   WALTER E. MCDONNELL.